(12) United States Patent
Brenner et al.

(10) Patent No.: US 10,737,233 B2
(45) Date of Patent: Aug. 11, 2020

(54) FLOW ELEMENT HAVING AN INTEGRATED CAPILLARY LINE FOR TRANSFERRING FLUIDS

(71) Applicant: hte GmbH the high throughput experimentation company, Heidelberg (DE)

(72) Inventors: Armin Brenner, Schwetzingen (DE); Oliver Koechel, Bubenheim (DE); Sebastian Keim, Mannheim (DE); Frank Guellich, Sandhausen (DE); Joerg Braschkat, Dossenheim (DE)

(73) Assignee: hte GmbH the high throughput experimentation company, Heidelberg (DE)

( * ) Notice: Subject to any disclaimer, the term of this patent is extended or adjusted under 35 U.S.C. 154(b) by 202 days.

(21) Appl. No.: 15/749,616

(22) PCT Filed: Aug. 5, 2016

(86) PCT No.: PCT/EP2016/068722
§ 371 (c)(1),
(2) Date: Feb. 1, 2018

(87) PCT Pub. No.: WO2017/021524
PCT Pub. Date: Feb. 9, 2017

(65) Prior Publication Data
US 2018/0221844 A1 Aug. 9, 2018

(30) Foreign Application Priority Data

Aug. 6, 2015 (EP) .................................... 15180046

(51) Int. Cl.
*G01N 31/10* (2006.01)
*B01J 19/00* (2006.01)
(Continued)

(52) U.S. Cl.
CPC .......... *B01J 19/0093* (2013.01); *B01J 4/008* (2013.01); *B01J 19/0046* (2013.01);
(Continued)

(58) Field of Classification Search
CPC ... A61J 1/00; B01D 57/02; B01J 19/00; B01J 19/02; B01J 19/24; B01J 19/0093;
(Continued)

(56) References Cited

U.S. PATENT DOCUMENTS 2,583,177 A    1/1952  Hoekstra
5,303,961 A *  4/1994  Popil .................... E03B 9/06
                                                137/294

(Continued)

FOREIGN PATENT DOCUMENTS

DE    102008032098 A1    2/2010
EP        1297889 A2     4/2003
WO     2010/003661 A1    1/2010

OTHER PUBLICATIONS

European Search Report dated Feb. 17, 2016 in corresponding European Patent Application No. 15 18 0046, with English Translation of Category of Cited Documents, 3 pages.
(Continued)

*Primary Examiner* — Jennifer Wecker
*Assistant Examiner* — Michael Paul Shimek
(74) *Attorney, Agent, or Firm* — Oblon, McClelland, Maier & Neustadt, L.L.P.

(57) ABSTRACT

The invention relates to a flow element for transferring fluids comprising a capillary cartridge (1) having an integrated capillary line (3). The capillary cartridge according to the invention (1) has a ring-shaped channel (8) and securing grooves (6, 6'), wherein the flow element is characterized in that the capillary line (3) is arranged in the ring-shaped channel (8). The ends of the capillary lines (3) are connected
(Continued)

to connection elements (9) in which securing grooves (6, 6') are secured in a positive locking manner. The flow elements according to the invention contribute toward improved manageability and effectiveness of components. In a preferred embodiment, the flow elements are used as a distribution system in the form of a plurality of capillary cartridges (1-1, 1-2, . . . ). Such distribution systems are of technical importance in the field of catalyst testing apparatuses with reactors arranged in parallel.

16 Claims, 6 Drawing Sheets (51) Int. Cl.
  *B01J 4/00* (2006.01)
  *B01J 19/24* (2006.01)
(52) U.S. Cl.
  CPC ......... *B01J 19/0073* (2013.01); *B01J 19/243* (2013.01); *B01J 19/2445* (2013.01); *G01N 31/10* (2013.01); *B01J 2219/0031* (2013.01); *B01J 2219/00286* (2013.01); *B01J 2219/00322* (2013.01); *B01J 2219/00389* (2013.01); *B01J 2219/00418* (2013.01); *B01J 2219/00587* (2013.01); *B01J 2219/00747* (2013.01); *B01J 2219/00783* (2013.01); *B01J 2219/00795* (2013.01); *B01J 2219/00808* (2013.01); *B01J 2219/00813* (2013.01); *B01J 2219/00891* (2013.01)
(58) Field of Classification Search
  CPC .. B01J 19/0046; B01J 19/0073; B01J 19/243; B01J 19/2445; B01J 4/008; B01J 2219/00747; B01J 2219/0031; B01J 2219/00783; B01J 2219/00418; B01J 2219/00389; B01J 2219/00286; B01J 2219/00322; B01J 2219/00587; B01J 2219/00795; B01J 2219/00808; B01J 2219/00813; B01J 2219/00891; B81B 7/00; C01B 3/38; C05F 17/00; C23C 16/455; F15D 1/00; F16L 19/00; F25D 31/00; G01N 27/447; G01N 30/02; G01N 33/53; G01N 31/10; G05D 11/00; H01L 23/552

See application file for complete search history.

(56) References Cited

U.S. PATENT DOCUMENTS

| | | | |
|---|---|---|---|
| 5,597,467 A * | 1/1997 | Zhu | G01N 27/44717 204/452 |
| 7,854,902 B2 | 12/2010 | Matteo | |
| 8,006,367 B1 | 8/2011 | Best | |
| 2003/0012700 A1* | 1/2003 | Carnahan | B01J 19/0046 422/400 |
| 2003/0145894 A1* | 8/2003 | Burns | B01F 5/0256 137/833 |
| 2005/0090805 A1* | 4/2005 | Shaw | A61M 39/26 604/523 |
| 2007/0280855 A1 | 12/2007 | Matteo | |
| 2008/0181829 A1* | 7/2008 | Matteo | B01J 19/0093 422/159 |
| 2008/0267844 A1 | 10/2008 | Guthrie | |
| 2010/0098594 A1* | 4/2010 | Matteo | B01L 3/502715 422/400 |
| 2011/0108132 A1* | 5/2011 | Moonen | G05D 7/0635 137/98 |

OTHER PUBLICATIONS

International Search Report dated Oct. 17, 2016 in corresponding European Patent Application No. 15796405.7. with English Translation of Category of Cited Documents, 5 pages.

International Preliminary Report on Patentability and Written Opinion dated Oct. 17, 2016 in PCT/EP2016/068722 (English Translation only).

Walter Wagner, "Strömung and Druckverlust", Vogel Fachbuch, 5th Edition, 2001, p. 94 and cover pages (with English Translation).

International Search Report dated Oct. 17, 2016, in PCT/EP2016/068722, filed Aug. 5, 2016.

* cited by examiner

FLOW ELEMENT HAVING AN INTEGRATED CAPILLARY LINE FOR TRANSFERRING FLUIDS

The present invention relates to a flow element for transferring fluids which comprises a capillary cartridge (1) having an integrated capillary line (3).

In a parallel arrangement of flow elements, which is preferred, the flow element is used as a distribution system for fluids.

The flow element or the distribution system is preferably used in apparatuses for the testing of catalysts, more particularly for the testing of reactors arranged in parallel.

Parallel reactor apparatuses are an essential instrument in high-throughput research in the field of heterogeneous catalysis because they make it possible to simulate industrial-scale processes on a laboratory scale. The further development and improvement of parallel reactors is of great technical interest because this accelerates the development of new catalysts and the improvement of catalytic processes.

The accuracy of simulation of catalytic processes depends on numerous parameters, wherein the handling of fluids, i.e. gases and liquids, is of particular importance. In particular, the flow element according to the invention provides improved supply and discharge of reactant fluid streams or product fluid streams.

Parallel reactor apparatuses have at least two reactors arranged in parallel. Within the meaning of the present invention, a reactor is understood to refer to a reaction chamber in which one or a plurality of reactant fluids is subjected to predetermined physical or chemical conditions in order thus to produce a reaction. By way of example—with no claim of completeness—one can mention the combination of two fluids or the thermal treatment or combined thermal treatment of combined fluids. The above-mentioned reactors are preferably tube reactors.

It is known from the prior art that fluids can be supplied to or discharged from the reactor via one or a plurality of distribution systems.

The distribution system or systems are preferably equipped with elements that throttle the flow, and in the case of a given flow, generate a pressure difference in the supplying line. Depending on the configuration and arrangement of the element throttling the flow, the pressure difference can assume a value in the range of 1 to 200 bar. Structural elements are known from the prior art that have a throttling action and are used in connection with apparatuses for testing catalysts. Capillaries are particularly preferred throttling elements.

Fluid distribution systems based on capillaries are part of the prior art, especially with respect to a homogeneous distribution of gas flows. An example of this is the patent U.S. Pat. No. 2,583,177 of the company Universal Oil Products, Chicago.

In U.S. Pat. No. 7,854,902 B1, various microfluidic reactor cartridges from the company Nano Tek are described and claimed. A microfluidic reactor cartridge that is equipped with coiled capillary lines is also disclosed as a microfluidic reactor cartridge. The cartridge comprises a reactor in which reactions are carried out.

The use of microchannels and capillaries for flow regulation is generally known. For example, EP 1297889 A from the company Symyx discloses reactors for parallel optimization of process flow based on microchannels. EP 1297889 A describes flow distribution systems in which flow restrictors having different restriction resistances are connected in parallel. The restrictors can be adjusted, thus making it possible to adjust the flow.

WO 2010/003661 A1 discloses test benches with controllable or adjustable restrictors. WO 2010/003661 A1 discloses the control and regulation of the fluids flowing through the restrictors by temperature control of the capillary lines. FIG. 3 of PCT application WO 2010/003661 A1 discloses a module with a plurality of capillaries arranged in parallel. FIG. 1 of PCT application WO 2010/003661 A1 shows various flow elements.

The present invention relates to capillary lines. Advantages of the present invention are that the manageability and effectiveness of throttling capillaries can be significantly improved compared to the structural elements known from the prior art. The uniform distribution and time constancy of the flow resistance constitute an essential factor contributing to the quality of the measurement data produced in operation of parallel reactor apparatuses.

PCT/EP2009/004945 describes the favorable effect of rigid thermal coupling of throttling capillaries and surrounding thermal insulation on the distribution of fluids in catalytic experiments. The effect essentially lies in that the capillaries are uniformly temperature-controlled with respect to one another and in that thermal disturbing effects, which e.g. are attributable to a temperature gradient in the heating oven, are kept away from the capillaries.

Capillary lines are often used as fluidic resistors. Within the meaning of the present invention, the term capillary line refers to tubelike arrangements, preferably tubes with a circular cross-section. The internal diameter of the capillary lines is in a range of 10-1000 µm, and preferably 20 to 250 µm, and their external diameter is in a range of 150 to 3000 µm.

The length of the capillary lines used in connection with the flow element according to the invention is in the range of 0.1-50 m, preferably 0.5-10 m, and more preferably 1-10 m.

According to the invention, the capillary lines are in coiled form so that they allow favorable manageability and can be used in technical apparatuses in a space-saving manner, preferably as fluid distribution elements in parallel reactor apparatuses.

The material properties of the capillary line depend on the specific technical use and the prevailing conditions connected therewith and are otherwise unlimited. In a preferred embodiment, capillary lines contain noble metal alloys, e.g. iron or nickel-based alloys are used, or other alloys having similar properties. Moreover, it is also preferred for capillary lines to be based on quartz glass or glass. Capillary lines of quartz or glass should preferably have a protective polymer coating in order to improve their mechanical stability.

Ceramic capillary lines, composed e.g. of quartz or glass, show only low mechanical stability. Minor mechanical stress can cause a ceramic capillary line to break, while kinks can occur in metal capillaries. Kinks and line deformations result in uncontrolled changes in flow resistance.

In the field of GC analysis technology, relatively large capillary lines are often used as gas chromatography separation columns. The lengths of these capillary lines are in the range of 1 to 100 m. In order to ensure proper manageability of the capillary lines, they are used as coils in the form of wound columns in the ovens of gas chromatographs. These wound columns are also referred to as "capillary coils."

It was found to be advantageous to fix the capillary coil in place. In this manner, the radius of the coils, or in the case of multiple winding of the capillaries, the distribution of the radii, can be kept constant.

It is known from the prior art that the flow resistance of a bent line is greater than that of a straight line because of said bending.

Because of the bending of the line, the fluid flowing through it undergoes deceleration on the side of the tube closest to the center of the bending compared to the side of the tube facing away from the center of the bending. This gives rise to an eddy that causes an apparent reduction in the cross-section of the tube. This effect is described by the "Dean number." A derivative can be found for example in the textbook "Strömung and Druckverlust [Flow and Pressure Loss]," Walter Wagner, pg. 94, Vogel Fachbuch, $5^{th}$ Edition. This effect (referred to as the Dean effect) causes the flow resistance to decrease with decreasing bending radius, primarily in the case of laminar flow in tubes. The Dean effect is most strongly pronounced at a Reynolds number of $RE \cong 2000$. In this case, flow resistance increases by 40% between a straight capillary ($r \to \infty$) and a coiled capillary with $r=2$ cm.

It has further been found in experiments that feeds in which ultrafine particles are distributed tend to plug capillary tubes. This results in a plug, primarily in the area of inflow into the capillaries. This can optionally be removed by reverse flushing of the capillary tubes, and in other cases, it is necessary to remove a short piece of the capillary line. In any case, it is required to remove the capillary lines from the system.

One of the objects of the invention is to improve the manageability of fluids in parallel reactor apparatuses. In particular, improved parallel reactor apparatuses are to be provided that can be used in the laboratory for simulating catalytic processes and that prevent or alleviate at least one of the above-mentioned drawbacks.

The objects mentioned here and further objects are solved by providing a flow element for transferring fluids that has a capillary cartridge (1) and a coiled capillary line (3), wherein the capillary cartridge contains a ring-shaped channel (8) and securing elements, and wherein the flow element is characterized in that the coiled capillary line (3) is arranged in the ring-shaped channel (8), with the ends of the capillary line (3) having one connection element (9) each. The connection elements (9) are secured by means of two or more securing elements at least in a positive locking and/or non-positive locking manner. Preferably, the securing elements are configured in the form of securing grooves (6,6').

Figure 3:
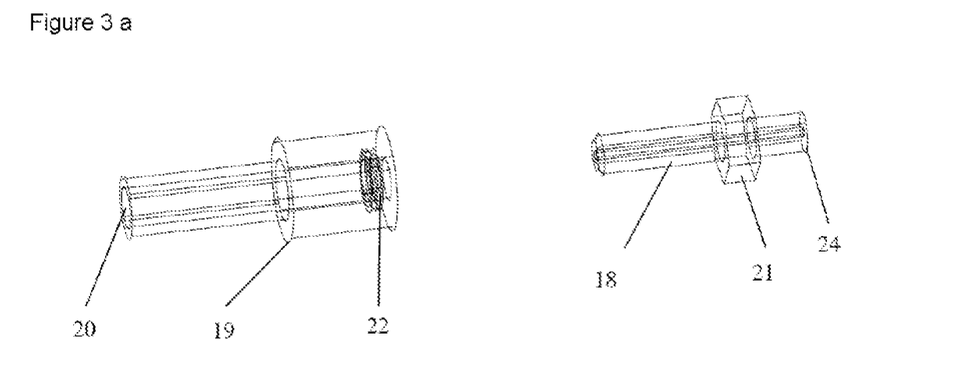

Preferably, the transition pieces are secured at least in a positive locking manner. The connection element (9) is configured to be either non-separable or separable. The non-separable embodiment is carried out e.g. by means of a bulkhead screw connection and is shown in FIG. 3.c. The separable variant is configured as a plug-in connector. An example of this variant is shown in FIG. 3.a/3.b. In the two embodiments, means or elements of the anti-rotation device (21) are provided that prevent the action of external forces on the connection elements (9) from causing movements of the capillary line (3). In an advantageous configuration, the capillary cartridge (1) is configured as a solid assembly.

The structure according to the invention ensures stabilization of the capillary line (3) in the capillary cartridge (1), thus better protecting the capillary lines (3) from mechanical damage. Moreover, the installation and removal of the flow elements in technical apparatuses is simplified compared to the installation and removal of capillary lines. The manageability of the capillary lines (3) arranged in the cartridges (1) is better and simpler than the manageability of the capillary coils known from the prior art. In a particularly advantageous embodiment, the capillary line (3) is fully integrated into the flow element, wherein the flow element forms a homogeneous block that protects the capillary line (3) from mechanical damage.

A capillary cartridge within the meaning of the present invention comprises a module containing at least one capillary or capillary line (3) and at least one housing. The term capillary cartridge thus refers to a module with at least one capillary (3) and at least one housing. Moreover, at least two elements are integrated into the module that make it possible to connect the capillary (3) to the supply and discharge lines respectively, wherein movements and force effects in particular are prevented from being transferred to the capillaries located in the module by said elements. The module can be replaced as a whole or as a unit. The supply and discharge lines are the lines of an apparatus with reactors arranged in parallel used for testing catalysts or for process optimization. The installation of the flow elements in this parallel reactor is particularly easy and therefore advantageous. The fixation in place of the flow element with supply and discharge lines means that a fluidic connection to the connection element (9) or connection elements (9) is established. The supply and discharge lines have an inner line diameter of 1-10 mm, and preferably 1.5-5 mm. The inner diameter of the supply and discharge lines is greater than the line diameter of the capillary lines themselves. The fixation in place of the flow element with supply and discharge lines also means that said fixation is fluid-tight. Sealants are thus present between the outer connection element (11, 11') and the supply and discharge lines to be attached thereto.

In a preferred embodiment, the capillary cartridge (1) of the flow element according to the invention is characterized in that the securing grooves (6, 6') form a positive locking connection to the connection elements (9) with an angularly configured anti-rotation device (21). This fixation preferably limits the rotatability about the longitudinal axis of the connection element (9) in the securing grooves (6, 6'), wherein the rotatability of the longitudinal axis is characterized by an angle of rotation of ≤20°, preferably ≤10°, and particularly preferably ≤5°. The limitation of rotatability is particularly advantageous, as this prevents or minimizes mechanical damage to the capillary lines (3). The cross-section of the securing grooves is preferably characterized by not being circular. The cross-section preferably has at least three corners, i.e. a triangular, square, pentagonal, or hexagonal cross-section, or is a cross-section having more than six corners.

The connection elements (9) are also preferably connected to the capillary cartridge (1) via the securing grooves (6, 6') in a non-positive locking manner. For example, the groove (25) shown in FIG. 3.c can be used for this purpose. On the one hand, this structural element restricts the rotatability of the connection elements (9), and on the other, all other degrees of freedom of movements that are outside the axis of symmetry of the connection element (9) are inhibited with respect to the capillary cartridge. The connection elements (9) allow the capillary lines (3) to be installed in and removed from the cartridge (1) in a simple manner.

In this case, the connection of the inner side of the connection element (9) to the end of the capillary line (4, 5) is preferably a screw connection, and more preferably, the screw connection is equipped with a compression seal.

In a preferred embodiment of the flow element, the connection element (9) is configured separably in the sense of a plug-in connector system, as shown in FIG. 3.*a* or FIG. 3.*b*. The plug-in parts (18) of the coupling system are preferably located on an outer side of the capillary cartridge (1). Corresponding to the plug-in parts (18), suitable coupling bodies (19) are preferably located in the front wall (17) of the surrounding housing. In an advantageous embodiment, the plug-in parts (18) and the coupling bodies (19) are configured in a replaceable arrangement.

Preferably, the flow element according to the invention is configured such that the connection elements (9) are located on different sides of the capillary cartridge (1), and preferably on opposite sides of the capillary cartridge (1).

In a preferred embodiment of the flow element, the capillary channel (8) is filled with a heat-conducting casting material. This improves thermal coupling to the capillary cartridge (1).

Fixation in place of the capillary line (3) can be mentioned as a further advantage of filling with the heat-conducting casting material.

In a further embodiment of the flow element according to the invention, the capillary cartridge (1) contains a material having favorable thermal conducting properties. The material of the capillary cartridge (1) is preferably a metal comprising at least one metal from the group of copper, aluminum, and brass. The thermal conduction is important for temperature control of the capillary lines (3). The flow elements can be arranged in ovens and temperature-controlled to desired target temperatures by means of said ovens. Homogenous temperature control of the capillary cartridges (1) and the capillary lines (3) arranged therein is of great importance for the flow properties of the fluids.

With respect to dimensioning of the flow element according to the invention, the capillary cartridge (1) should preferably have a bottom surface area in the range of 10 to 400 cm$^2$, and preferably in the range of 20 to 200 cm$^2$, with the width of the capillary cartridge (1) preferably being in the range of 0.5-6 cm, and more preferably in the range of 1-4 cm. The two bottom surfaces of an individual flow element are preferably arranged in parallel, which allows connection of individual capillary cartridges (1) to form capillary cartridge stacks (1-1, 1-2, 1-3, . . . ).

In a particularly advantageous embodiment of the flow element according to the invention, one side of the bottom surface of the flow element also forms the insertion opening of the capillary line (1) into the channel (8). In this case, it is also further preferred that the same side of the bottom surface form the insertion opening for the connection elements (9). For example, the insertion openings can e.g. be the grooves for the connection elements (6, 6') and thus constitute the securing grooves (6, 6'). The embodiment presented here also provides advantageous assembly of the flow element. The assembled flow element is a highly compact component that can be particularly advantageously used as a fluid flow element in apparatuses. An aspect of the invention thus relates to the advantageous manageability of the flow element, which relates both to the assembly of the flow element and to the positioning and fixation of the flow element as a fluid flow element in reaction apparatuses equipped with reactors arranged in parallel and used for testing catalysts. The reactors arranged in the reaction apparatuses are used for testing solid catalysts and/or process optimization.

The capillary line (3) arranged in the capillary cartridge (1) preferably has a length in the range of 0.1-50 m, preferably 0.5-10 m, and more preferably 1-10 m.

In a preferred embodiment, the capillary cartridge (1) has at least one control.

In a further embodiment, which is also preferred, the invention relates to a distribution system composed of a plurality of flow elements, wherein the flow elements are preferably arranged in stack form.

Further preferred is a distribution system in which the plurality of flow elements is contained in a housing (12, 13, 14, 15, 17), wherein the housing is equipped with an apparatus for heating and/or cooling of the flow elements. This housing is also produced according to the above presentation from a material having favorable thermal conductivity. High thermal conductivity combined with high thermal capacity favorably affects equalization of temperature transients. High thermal conductivity in connection with high thermal capacity is achieved in this connection using, for example, 0.5 kg of aluminum.

Further preferred is an embodiment of the distribution system in which the individual flow elements are essentially thermally decoupled from one another. In this case, each flow element preferably has at least means for heating and/or cooling, preferably a means for heating and/or cooling for each module/capillary cartridge (1), and preferably a means for heating.

In a preferred embodiment, the housing enclosing the flow elements, which is equipped with the apparatus for heating and/or cooling, is also enclosed by insulation.

Figure 5:
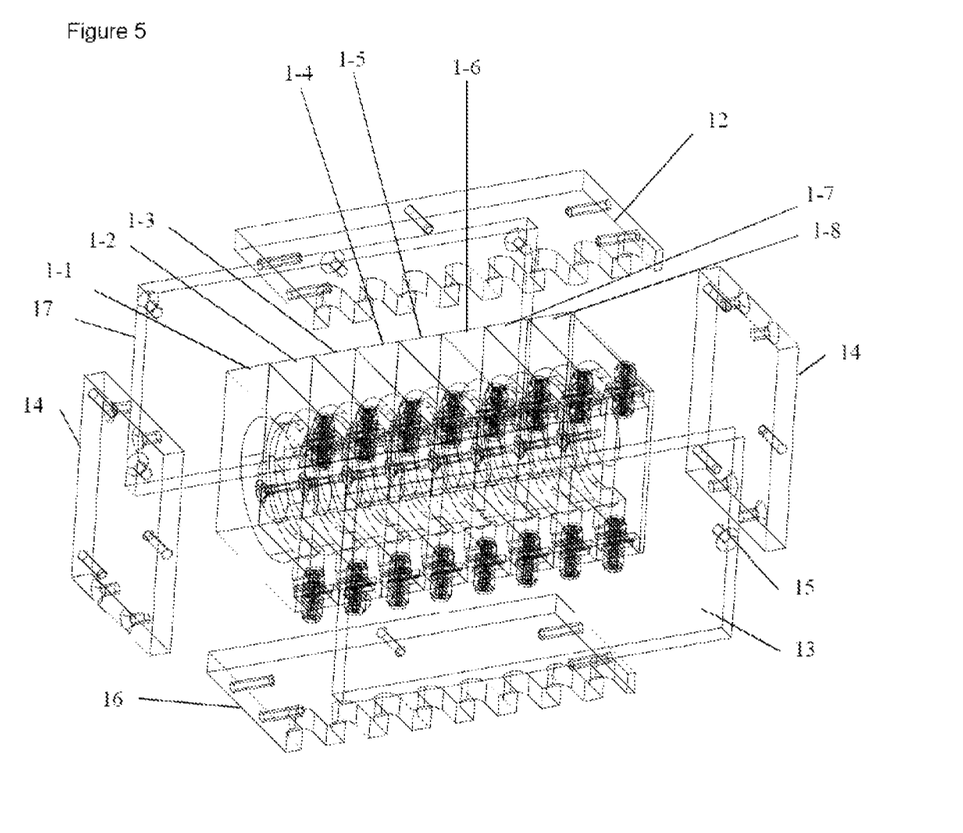
FIG. 5 shows a diagrammatic view of a distribution system with eight flow elements arranged in a stack with eight capillary cartridges (1-1 to 1-8) surrounded by the plates of the housing wall. Here, the variant is shown with couplings that are individually screwed into place. This arrangement is also suitable for the use of self-locking plug-in connectors.
Figure 6:
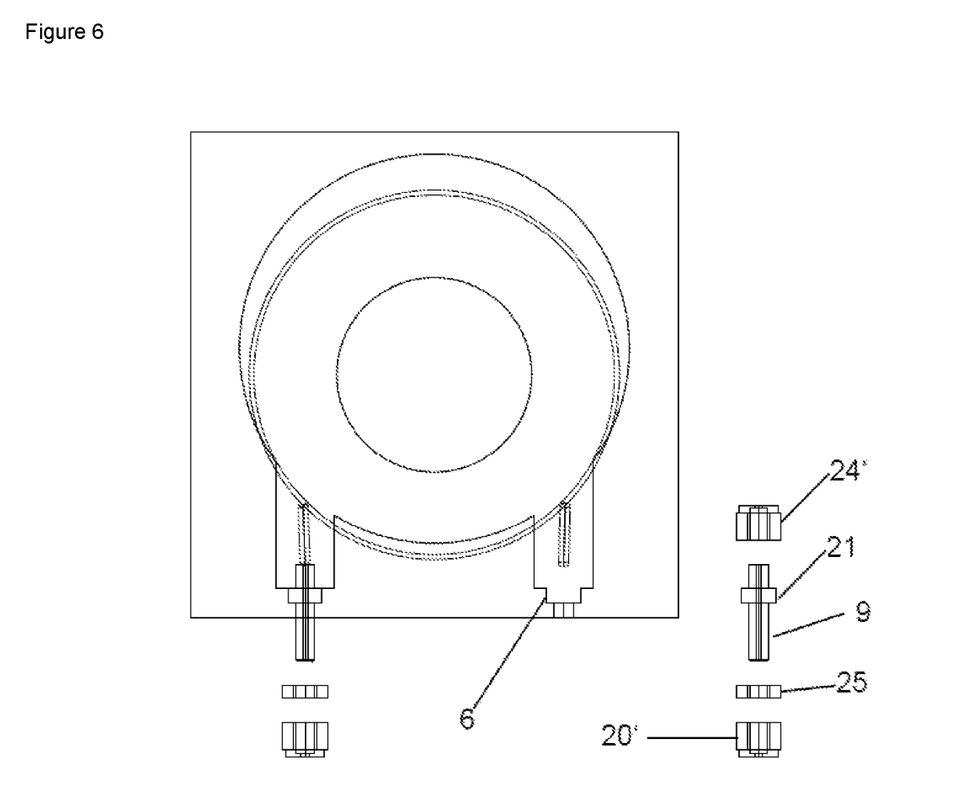
FIG. 6 shows a schematic illustration of how the coupling units in FIG. 3c are affixed to the flow element of the present invention by way of the securing groove (6).

In a preferred embodiment, the housing accommodates parts of a sealing fluidic coupling system, the counterparts of which are located on one side of the base element of the capillary cartridge (1). See FIG. 2 for details. The coupling system is configured such that fluidic coupling of the capillary cartridge to the surrounding housing can be achieved simply by sliding the capillary cartridge into the surrounding housing. In this case, measures are to be taken to ensure that the couplings are not pressed apart by the fluidic pressure. For example, the cover (14) of the surrounding housing, which is shown in FIG. 5, can be used for this purpose. Other positive locking means are also suitable. An example of a positive locking means is illustrated in FIG. 5, wherein in FIG. 5 a pin is inserted through the covering (13). The removable pin, which for example can engage with a recess in the base element, is not shown in FIG. 5. If the covering (13) is sufficiently large, i.e. extends beyond the edge opposite the couplings, it is also preferable for the pin to engage on the opposite side of the couplings. Moreover, non-positive locking means, such as e.g. clamping with a spindle, are also included according to the invention.

In a further preferred embodiment, the couplings are located on two opposite sides. This corresponds to the embodiment shown in FIG. 1. In this case, measures are taken to prevent the separable connection elements (9) from coming loose under the pressure prevailing inside them. For this purpose, the separable connection elements (9) themselves should preferably contain a locking mechanism. It is further preferred for couplings to be arranged without a locking mechanism in a surrounding structure that absorbs the forces generated and allows loosening of the couplings.

In a further preferred embodiment, the connection elements (9) are located on adjacent surfaces of the base element (2) of the capillary cartridge (1). This is to be seen as a combination of the two arrangements described above, and the measures for sealing and mechanical securing mentioned in the two paragraphs above are therefore to be implemented.

In an embodiment, the flow elements according to the invention are preferably arranged as a distribution system. The distribution system constitutes a further aspect of the invention.

The flow element or the distribution system is preferably used in parallel reactor apparatuses. Use of the flow element and distribution system according to the invention provides technical advantages with respect to the manageability of the structural elements and the accuracy of the data quality. It is further preferred for the flow elements used herein to have a calibration that has already been determined prior to installation in the apparatus.

The distribution system according to the invention ensures precise temperature control of the capillary lines (3) arranged in the individual flow elements.

This makes it possible to control thermal effects more favorably than can be achieved with other temperature control means and arrangements of the prior art. The improved control of fluid flow conditions also allows better accuracy of the catalysis data to be achieved.

Figure 4:
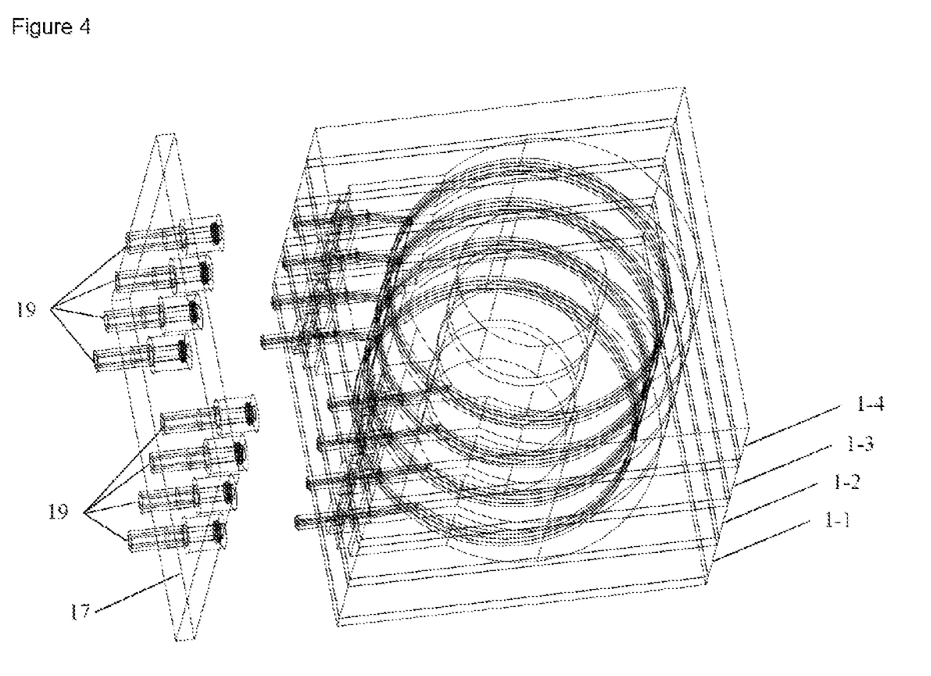
FIG. 4 shows a diagrammatic view of a distribution system composed of a stack-type arrangement of four flow elements in which all of the connection elements (9) are arranged on the same side. The coupling body (19) is located in the front wall (17) in the extension of the connection elements (9). Here, the emphasis is on the arrangement of the plug-in connectors.

An embodiment is therefore preferred in which the capillary cartridges according to the invention are arranged in a parallel reactor apparatus as a distribution system for fluids. The manageability of the capillary cartridges is substantially improved by the configuration according to the invention and the arrangement inside the parallel reactor apparatus. It can be mentioned as a particular advantage of the preferred embodiment that each of the capillary cartridges, which are arranged in parallel groups, can be individually replaced. The corresponding situation is shown in FIG. 4 without a surrounding housing. In particular, it is also preferable if replacement of the individual capillary cartridges can be carried out during operation of the parallel reactor apparatus. The embodiment is shown by way of example in FIG. 2 for an individual capillary cartridge. In this embodiment, the lines to the couplings of the capillary cartridges are provided with shut-off valves, or the couplings themselves are provided with locking elements (self-locking couplings). These elements prevent the uncontrolled leakage of fluid streams during replacement of the individual capillary cartridges. In capillary cartridges that can be replaced during operation of the apparatus, the respective couplings are located on the same side of the cartridge. Maintenance work on parallel reactor apparatuses can be substantially improved by using the capillary cartridges according to the invention. It is particularly preferable that the replacement of flow elements can be carried out during operation of the system, as the reactors and the catalysts contained therein can be stored at one operating temperature. Maintenance times and down times in operation of apparatuses with reactors arranged in parallel can thus be efficiently reduced.

In addition to the further adjustment of the temperature gradient, a surrounding housing provides spatial stabilization of the capillary cartridges and thus allows the forces arising from fluidic pressure on the couplings to be absorbed. These are directed such that they drive the separated connection elements away from one another. Corresponding detachable fixing elements that always act on a single capillary cartridge alone are positive locking or non-positive locking connections between at least one part of the housing and one cartridge respectively.

EXAMPLE EMBODIMENTS OF THE FLOW ELEMENT ACCORDING TO THE INVENTION

FIGS. 1 through 5 show the flow elements according to the invention or individual aspects of the flow elements or the distribution system according to the invention. These figures are by no means to be interpreted as limiting the present invention in any way.

In an example embodiment, which is preferred, the capillary cartridge (1) comprises a metal block for accommodating the capillary line (1). The dimensions of the capillary cartridge (1) in this example are 10×10×20 cm. By way of example, this is a cartridge (1) with a square bottom surface. The bottom surface is passed through by a ring-shaped channel (8), wherein the channel (8) is configured to be suitable for accommodating a capillary line (3). Moreover, the capillary cartridge also has securing grooves (6,6') that serve to accommodate connection elements (9). In a special configuration, the connection elements (9) can be designed as so-called bulkhead screw connections. A bulkhead screw connection is a tube-shaped connection element, wherein a screw thread is disposed on the outer side of the tube-shaped base element and measures are implemented in the interior that allow a fluidic connection. At the respective ends of the tube-shaped base element, respective compression screws are arranged by means of which the supply or discharge lines are secured and fluidically connected to the base element and thus to one another. Moreover, an anti-rotation device is located approximately in the middle of the base element. This is typically configured in a square or hexagonal shape, wherein the cylindrical base element is located in the center of the anti-rotation device and undetachably connected thereto. After removal of one of the compression screws, moreover, a nut can be tightened so that the anti-rotation device is pressed against the edge of a bore hole. In this manner, the positive locking action of the anti-rotation device is supported by a non-positive locking action.

In particular, cartridges (1) with a separable and non-separable connection element (9) are preferred.

Figure 1:
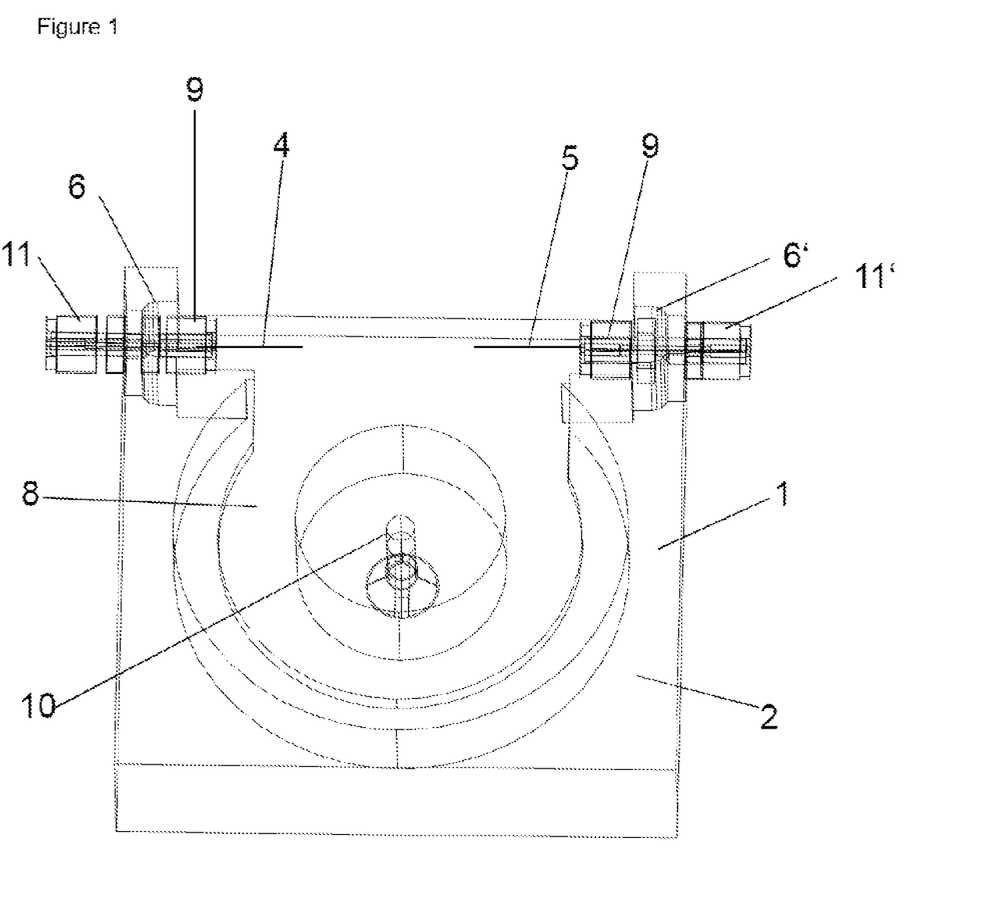
FIG. 1 shows a diagrammatic view of the flow element according to the invention fitted without a capillary line (3); in the embodiment shown, the two connection elements (9) lie on opposite sides in one axis. Bulkhead screw connections according to FIG. 3.*c* are shown as connection elements (9).
Figure 2:
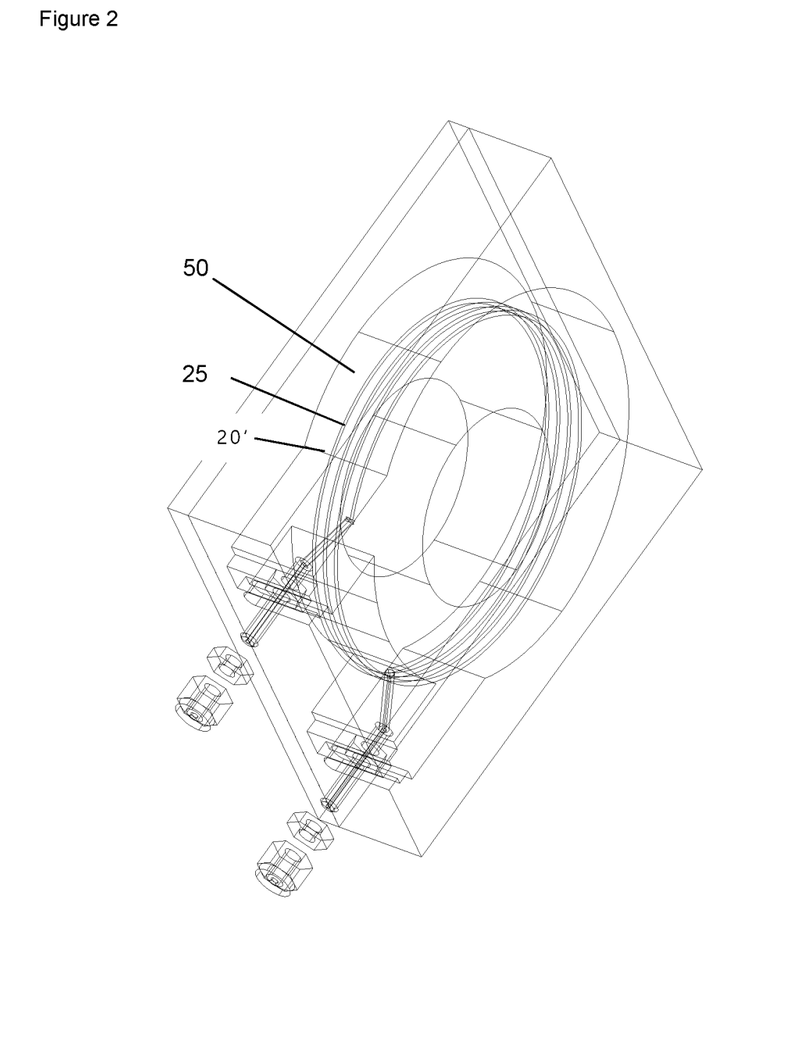
FIG. 2 shows a diagrammatic view of a flow element. The embodiment according

These receiving elements for the connection elements (9) can be arranged on opposite sides, as shown in FIG. 1 or 2. In a further preferred embodiment, the connection elements (9) are disposed on one side, and it is also preferable if the transition elements are disposed on adjacent sides. In either case, the transition elements are arranged such that they are secured against rotation. Secured against rotation means that the plug-in part (18) or the coupling body (19) is connected to the body by means of positive locking means, preferably an anti-rotation device (21), such that the base element can rotate a maximum of 30°/20°/10° with respect to the capillary cartridge (1). This measure for positive locking ensures both that the external supply lines cannot be rotated due to mounting of the internal capillaries (3) and that the internal capillaries (3) cannot be rotated due to mounting of the external supply lines.

The term "securing means" within the meaning of the present invention refers to means with which a) the capillary cartridge (1) is locked, e.g. the covering is fixed in place with a securing means, and b) the positive locking e.g. of the connection element (9) in the groove is supported.

In cases in which the invention is used in the form of an individual flow element, the capillary cartridge (1) is provided with a control or a covering. The control can be secured e.g. with screws, springs, or clamps. The covering is partially visible in FIG. 1. Among other effects, the covering also causes the capillary line (3) to be maintained inside the ring-shaped channel (8) of the capillary cartridge. The covering further has the object of keeping tensile phenomena, and thus disturbing thermal influences, away from the capillary (3).

Housing

If the invention is implemented in a preferred embodiment of a distribution system with a plurality of flow elements, it is advantageous to arrange the individual flow elements in stack form, as flow elements arranged in stack form can be particularly advantageously placed in a housing, or the housing can be advantageously arranged around the flow elements.

An exploded view of this arrangement is shown in FIG. 4. The flat bottom surfaces are advantageous in that the one bottom surface can be used as a covering or control for the adjacent capillary cartridge.

The capillary cartridges advantageously comprise a material having favorable heat conducting properties. Examples include materials from the group of copper, aluminum or brass. Preferred are materials whose thermal conductivity is greater than or equal to 100 W m$^{-1}$ K$^{-1}$, and more preferably greater than or equal to 400 W m$^{-1}$ K$^{-1}$.

With respect to the material thickness of the housing, it should preferably have a material thickness of ≥5 mm, more preferably ≥10 mm, and even more preferably >20 mm.

An advantage of the preferred material thickness is that it allows the improvement of making the temperature field more homogeneous. A highly homogeneous temperature field allows uniform temperature control of the internal space.

In a further embodiment, which is also preferred, the distribution system enclosed by a housing is arranged in an oven. For example, this can be a convection oven. Selective temperature control of the flow elements makes it possible to adjust the viscosity of the fluid guided in the capillaries (3) such that the pressure drop required for the experiment is generated over the capillary (3). It should be borne in mind that the viscosity of gases increases with temperature, while the viscosity of liquids decreases.

Heating/Cooling

In a further embodiment, the housing enclosing the distribution system is equipped with its own heating. This heating can take place e.g. by means of surface heating elements, heating films, or channels through which a heat transfer liquid flows.

Cooling means can be arranged on the external surface of the surrounding housing. Preferred are heat exchangers through which fluid can flow, but fluid flowthrough can also be achieved in that the housing components contain direct bore holes for fluids. It is further preferred to incorporate channels into the housing into which tubes for fluids are pressed. Moreover, cooling elements based on the Seebeck effect (Peltier cooling elements) are preferred.

Selective cooling is also a means for adapting the viscosity of the fluids guided through the capillary lines to the experimental requirements.

In cases where precise adjustment of the viscosity to a specified value and thus maintenance of a particular temperature does not play a decisive role, but the highest possible uniformity of the flow resistances among one another is the sole important factor, heating or cooling is not necessary. In this case, it is sufficient to provide the surrounding housing on the outer side with thermal insulation.

In this case, the heat transfer coefficient of the thermal insulation should preferably be less than 1 W m$^{-1}$ K$^{-1}$.

Heat Conducting, Hardening Material

In precise measurements of the conductance of the coiled capillary lines (3), it has been found that both the spatial position of the capillaries, i.e. the winding radius, and constant heat flow in the capillaries (3) are important for constancy of the flow resistances. The spatial position of the coils, the coiled capillary lines (3), can be fixed by filling the circumferential channel with a heat conducting, hardening material. The use of silicone casting materials has been found to be particularly effective in this connection, especially silicone casting materials with significant thermal conductivity. In any case, the thermal conductivity of these materials is greater by 1 to 2 orders of magnitude than the conductivity of air or the conductivity generated by contact between the capillary lines (3) and the capillary cartridge (1).

An embodiment is preferred in which the capillary cartridges (1) are individually temperature-controlled and thermally decoupled from one another. Temperature control is to include both measures for increasing the temperature above the ambient temperature and measures for reducing it below the ambient temperature. The individual temperature control devices are advantageously equipped with means or elements for keeping the temperature constant, i.e. temperature controllers.

Moreover, it is preferable for the capillary lines (3) to be replaceable inside the flow elements after they wear out, so that it is possible to equip the cartridges (1) with new capillary lines (3) and then reuse them.

Moreover, the connecting lines can also be equipped in the outer area with bayonet connections, thus allowing rapid connection and removal of the supply lines.

BRIEF DESCRIPTION OF THE FIGURES

FIG. 2 shows the flow-element equipped with coupling elements which are shown in FIG. 3*c*. In this particular embodiment the connecting element (9) is held in the notch (50) by help of the nut (25). The anti-rotation device (21) which is given by a triangular, preferably tetragonal, further preferably hexagonal element is part of the tubular connection element (9). Therefore the at least triangular element (21) prevents element (9) from twisting along its rotational axis which is perpendicular to the channel direction of connection element (9).

FIG. 3.*a* shows a view of the connection element (9) in the embodiment of a separable plug-in connector. The plug-in part (18) and the coupling body (19) of the coupling are shown in an opened state.

FIG. 3.*b* like FIG. 3.*a*, however, is shown in a closed state.

FIG. 3.*c* shows a view of the connection element (9) as a bulkhead screw connection. This refers to a connection with an e.g. compression screw (20' or 24') on either side. This connection element is not separable.

LIST OF REFERENCE SIGNS

1—Capillary cassette
2—Base element
3—Capillary line or capillary
4—End piece of the capillary line on inlet side
5—End piece of the capillary line on outlet side
6,6'—Securing element in the form of securing groove for accommodating the connection element (9)
8—Channel
9—Connection element
10—Center of the base element
11,11'—Outer connection element of the connection element
12—Upper part
13—Removable rear wall
14—Side part
15—Closure of the rear wall, shown as a countersunk screw
16—Lower part
17—Front wall
18—Plug-in part of the coupling
19—Coupling body
20—Outer connection element
20'—Outer connection element, embodiment Compression screw
21—Anti-rotation device
22—Sealing element
23—Section of front wall 17
24—Inner connection element
24'—Inner connection element, embodiment Compression screw
25—Groove for securing the connection element
1-1, 1-2, . . . , 1-8—Various capillary cartridges

The invention claimed is:

1. A flow element comprising:
a capillary cartridge and a coiled capillary line,
wherein the capillary cartridge comprises a ring-shaped channel and a securing element,
wherein said securing element is in the form of securing grooves,
in the flow element, the coiled capillary line is arranged in the ring-shaped channel,
each end of the capillary line is connected to a connection element by screw connections with a compression seal, respectively, and
the connection element is fixed in place with two or more securing elements,
wherein the securing grooves form a positive locking connection to the connection elements with an angularly configured anti-rotation device, or wherein the connection elements are connected to the capillary cartridge via the securing grooves in a non-positive locking manner, such as clamping with a spindle.

2. The flow element of claim 1,
wherein the two or more securing elements are configured as securing grooves, which are an inlet-side securing groove and an outlet-side securing groove.

3. The flow element of claim 2,
wherein each of the inlet-side and outlet-side securing grooves accommodates an anti-rotation device of the connection element, and
the anti-rotation device has at least three corners, so that at least one edge of the anti-rotation device runs parallel to an edge of the inlet-side or outlet-side securing groove, so that a rotatability of the connection element about its longitudinal axis is characterized by an angle of rotation of ≤20°.

4. The flow element of claim 2,
wherein the connection element is also connected to the capillary cartridge in the securing grooves in the non-positive locking manner.

5. The flow element of claim 1,
wherein a connection between an inner side of the connection element and the end of the capillary line is a screw connection.

6. The flow element of claim 1,
wherein an outer side of the connection element is equipped with a screw thread, which t allows a non-positive locking and sealing connection with lines located outside the capillary cartridge.

7. The flow element of claim 1,
wherein the connection element consists of two separable parts, such that a sealing system fluidically seals an inner channel of the connection element with respect to an environment.

8. The flow element of claim 1,
wherein the capillary cartridge comprises a metal.

9. The flow element of claim 1,
wherein the capillary cartridge comprises a device that controls the temperature of the capillary chamber and/or
a space inside the capillary channel is filled with a heat-conducting casting material.

10. A distribution system, comprising at least two of the flow element of claim 1.

11. The distribution system of claim 10,
wherein the distribution system is enclosed by a housing.

12. The distribution system of claim 10,
wherein each of the flow element is thermally decoupled from one another.

13. The distribution system of claim 11,
wherein the housing is surrounded by insulation.

14. A method for testing a catalyst, the method comprising:
testing a catalyst in a reaction apparatus,
wherein the reaction apparatus comprises a distribution system comprising the flow element of claim 1.

15. A method for transferring at least one fluid, the method comprising:
transferring the at least one fluid in at least one reaction apparatus,
wherein the at least one reaction apparatus comprises the flow element of claim 1 and two reactors arranged in parallel.

16. A method for transferring at least one fluid, the method comprising:
transferring the at least one fluid in at least one reaction apparatus,
wherein the at least one reaction apparatus comprises the distribution system of claim 10 and two reactors arranged in parallel.

* * * * *

UNITED STATES PATENT AND TRADEMARK OFFICE
CERTIFICATE OF CORRECTION

PATENT NO. : 10,737,233 B2
APPLICATION NO. : 15/749616
DATED : August 11, 2020
INVENTOR(S) : Brenner et al.

It is certified that error appears in the above-identified patent and that said Letters Patent is hereby corrected as shown below:

On the Title Page

On Page 2, Column 2, Item (56), under "OTHER PUBLICATIONS", Line 2, delete "15796405.7." and insert -- 15796405.7, --, therefor.

In the Specification

In Column 3, Line 49, delete "(6,6')." and insert -- (6, 6'). --, therefor.

In Column 8, Line 9, delete "(6,6')" and insert -- (6, 6') --, therefor.

In Column 8, Line 33, delete "FIG." and insert -- FIGS. --, therefor.

In Column 10, Line 33, delete "flow-element" and insert -- flow element --, therefor.
    Line 35, delete "3c." and insert -- 3.c. --, therefor.

In Column 11, Line 2, delete "3c" and insert -- 3.c --, therefor.

In Column 11, Line 12, delete "6,6'-Securing" and insert -- 6, 6'-Securing --, therefor.

In Column 11, Line 17, delete "11,11'-Outer" and insert -- 11, 11'-Outer --, therefor.

In the Claims

In Column 12, Claim 9, Line 30, delete "chamber" and insert -- chamber, --, therefor.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*